(12) United States Patent
Akama

(10) Patent No.: US 6,323,569 B1
(45) Date of Patent: Nov. 27, 2001

(54) STEPPING MOTOR

(75) Inventor: Kazunori Akama, Tokyo (JP)

(73) Assignee: NGB Corporation, Tokyo (JP)

( * ) Notice: Subject to any disclaimer, the term of this patent is extended or adjusted under 35 U.S.C. 154(b) by 0 days.

(21) Appl. No.: 09/433,370

(22) Filed: Nov. 3, 1999

(30) Foreign Application Priority Data

Nov. 6, 1998 (JP) ................................. 10-315571

(51) Int. Cl.$^7$ ................................................. H02K 37/00
(52) U.S. Cl. ...................... 310/49 R; 310/112; 310/257
(58) Field of Search ........................... 310/49 R, 257, 310/112

(56) References Cited

U.S. PATENT DOCUMENTS

| | | | | |
|---|---|---|---|---|
| 4,634,948 | * | 1/1987 | Brigham | 318/696 |
| 4,794,292 | * | 12/1988 | Torisawa | 310/49 R |
| 4,823,038 | * | 4/1989 | Mizutani et al. | 310/49 R |
| 4,972,109 | * | 11/1990 | Kakizaki et al. | 310/49 R |
| 5,132,603 | * | 7/1992 | Yoshimoto | 318/696 |
| 5,177,384 | * | 1/1993 | Furuki | 310/49 R |
| 5,410,200 | * | 4/1995 | Sakamoto | 310/49 R |
| 5,691,583 | * | 11/1997 | Suzuki et al. | 310/49 R |
| 5,856,714 | * | 1/1999 | Sugiura | 310/49 R |
| 6,060,800 | * | 5/2000 | Suzuki et al. | 310/49 R |

FOREIGN PATENT DOCUMENTS 59-063972 * 4/1984 (JP) ................................. H02K/37/00

* cited by examiner

*Primary Examiner*—Burton S. Mullins
(74) *Attorney, Agent, or Firm*—McGuireWoods LLP

(57) ABSTRACT

A stepping motor 10 having a configuration which includes: a rotor 14 constituted by a rotor magnet 14b magnetized circumferentially; a stator 13 constituted by a plurality of phases of stator yokes 16a to 16h arranged side by side in an axial direction of the stepping motor so as to surround the rotor, and coils 17a to 17d wound in coil winding portions defined by the stator yokes; an armor member 11, 12 for holding the stator yokes with respect to the axial direction of the stepping motor; and each phase of the stator yokes being constituted by a pair of stator yokes on which magnetic pole teeth of plural phases arranged annularly are combined alternately; wherein the stator yokes are arranged so that every two phases of the stator yokes are paired to form an even number of sets of stator yokes; wherein two phases a and b and c and d in each set of the stator yokes are reverse to each other; and wherein coils 17a and 17b and 17c and 17d provided on the two phases of stator yokes in each set are connected to generate magnetic fields in series and in reverse to each other.

4 Claims, 7 Drawing Sheets

COMPARISON OF TORQUE CHARACTERISTIC

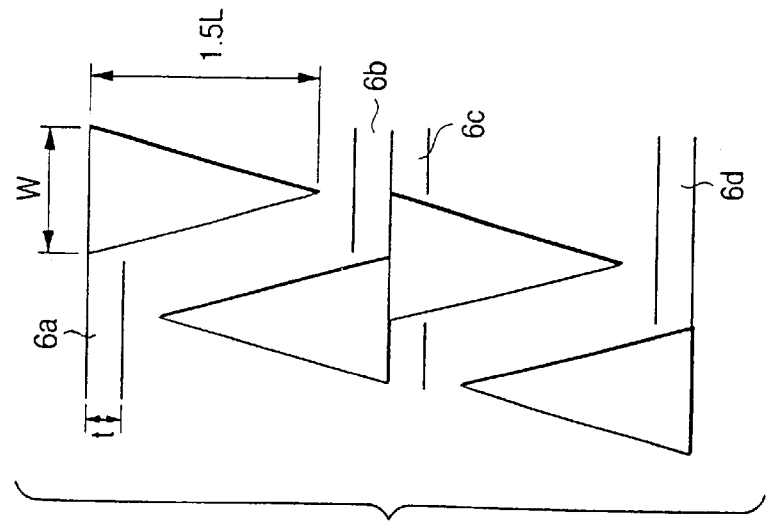
FIG. 13 (C) BACKGROUND ART
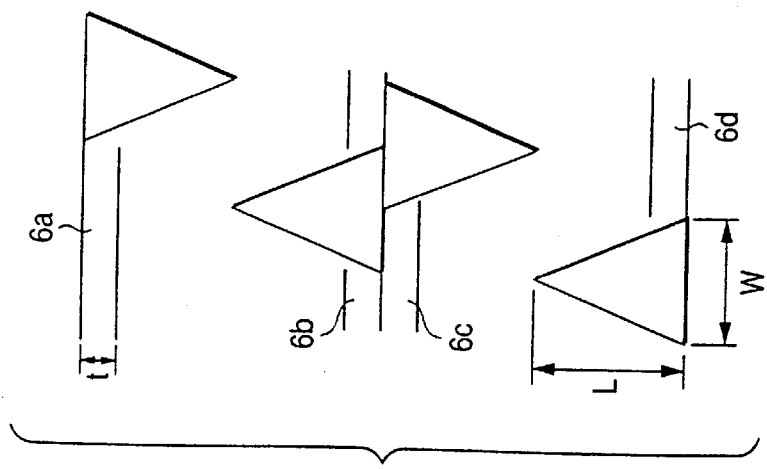
FIG. 13 (B) BACKGROUND ART
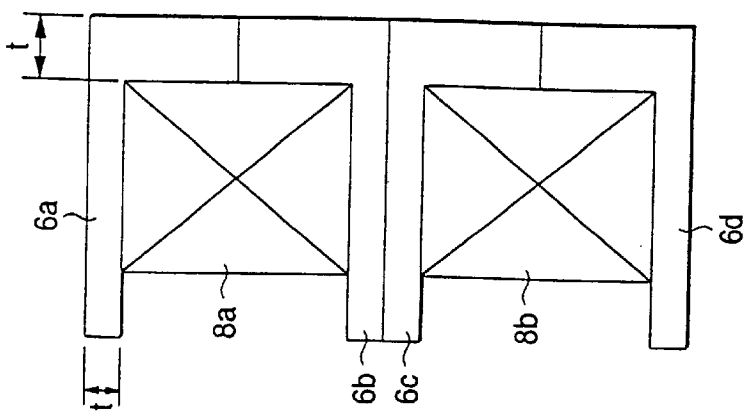
FIG. 13 (A) BACKGROUND ART

STEPPING MOTOR

BACKGROUND OF INVENTION

1. Field of Invention

The present invention relates to a stepping motor, and particularly relates to a stepping motor comprising a stator provided with stator yokes each having magnetic pole teeth.

2. Related Art

Heretofore, a stepping motor is configured, for example, in such a manner as shown in FIGS. 8 and 9.

That is, as shown in FIG. 8, a stepping motor 1 includes a hollow cylindrical housing 2 having an open end, a bracket 3 for closing the open end of the housing 2, a stator 4 provided along the inner circumferential surface of this housing 2, and a rotor 5 supported rotatably by bearing portions 2a and 3a provided in the housing 2 and the bracket 3 respectively.

The above-mentioned housing 2 is made of metal material and provided with the bearing portion 2a in a position near the center of the closed end surface of the housing 2.

The above mentioned bracket 3 is made of metal material and provided with the bearing portion 3a in a position near the center of the bracket 3 in the same manner as in the housing 2.

As shown in FIG. 9, the above-mentioned stator 4 is constituted by a substantially cylindrical yoke unit 6 in which four stator yokes 6a to 6d each provided with a ring-like flange portion having an outer diameter substantially equal to the inner diameter of the housing 2 so as to be stored in the housing 2 are integrally molded with a bobbin 7 of resin, and coils 8a and 8b wound on coil winding portions defined by the stator yokes 6a and 6b and by 6c and 6d respectively. The stator 4 is stored and fixedly held in the housing 2 after the coils 8a and 8b have been wound.

The above-mentioned rotor 5 is constituted by a rotating shaft 5a rotatably supported by the above-mentioned bearing portions 2a and 3a, and a hollow cylindrical rotor magnet 5b fixedly held on the rotating shaft 5a. This rotor magnet 5b is formed to have an outer diameter slightly smaller than the inner diameter of a central hole of the yoke unit 6. The rotor magnet 5b is magnetized circumferentially.

Here, the above-mentioned stator yokes 6a to 6d are configured, for example, as shown in FIG. 10.

Since all the stator yokes 6a to 6d have the same shape, only the stator yoke 6a is shown in FIG. 10.

In FIG. 10, the stator yoke 6a is made of conductive metal material, and constituted by a ring-like flange portion 6e and a large number of magnetic pole teeth 6f provided to erect vertically from an inner circumferential portion of this ring-like flange portion 6e.

The four stator yokes 6a to 6d are combined so that the stator yokes 6b and 6c are put back to back with each other, and the magnetic pole teeth 6f of one pair of the stator yokes 6a and 6b are shifted in phase by a predetermined value from those of the other pair of the stator yokes 6c and 6d. In this state, the stator yokes 6a to 6d are stored in a mold for molding the bobbin 7, so that the bobbin 7 of resin is integrally molded around the stator yokes 6a to 6d. The yoke unit 6 is completed thus.

In the illustrated case, the stepping motor 1 has a flange 9 on the closed end side of the housing 2 so as to be attached by means of screws or the like to an electronic equipment utilizing the stepping motor 1.

According to the stepping motor 1 configured thus, when a driving current is made to flow into the respective coils 8a and 8b of the stator 4, magnetic fields generated in the coils 8a and 8b interact with the magnetic field of the rotor magnet 5b through the respective stator yokes 6a to 6d of the yoke unit 6. Then, the rotor 5 is driven and rotated intermittently by the effect of the magnetic pole teeth 6f of the respective stator yokes 6a to 6d.

However, the stator yokes 6a and 6d located on the opposite ends are in tight contact with the end surface of the housing 2 or the surface of the bracket 3 while the stator yokes 6b and 6c located inside are in back-to-back contact with each other. Therefore, magnetic flux leaks out of the magnetic circuits constituted by the pair of stator yokes 6a and 6b and the pair of stator yokes 6c and 6d together with the coil 8a and 8b respectively so that magnetic interference is generated between the magnetic circuits.

Here, in the case where the stepping motor 1 is driven by so-called single-phase excitation, and when, for example, the rotor 5 stops sequentially at rotor stop positions shown by the symbols S1, S2, S3, S4 . . . with respect to the magnetic pole teeth 6f of the stator yokes 6a to 6d as shown in FIG. 11, theoretically, the magnetic center is switched as shown by the symbols A, C, B and D.

However, when the above-mentioned leakage of magnetic flux is generated, for example, at the stop position S2, the magnetic flux of the stator yoke 6c slightly leaks also to the stator yoke 6b so that the magnetic center is slightly shifted from the position C toward the position B. Accordingly, the position where the rotor 5 stops actually is also shifted to the position B side.

Similarly, at the stop position S3, the magnetic flux of the stator yoke 6b slightly leaks also to the stator yoke 6c so that the effects of excitation of the yokes 6b and 6c are canceled with each other. Accordingly, the magnetic center is slightly shifted from the position B toward the position C. Accordingly, the position where the rotor 5 stops actually is also shifted to the position C side.

In order to reduce such shift of the stop position of the rotor 5 due to the leakage of magnetic flux, heretofore, there are a method in which the dimensions of the comb-like magnetic pole teeth 6f in each phase are changed to balance the magnetic force among the respective pole teeth portions 6f; a method in which the angle with which the stator yokes 6b and 6c are combined is slightly shifted from a theoretical angle in order to correct the stop position; and so on. However, since scattering of the magnetic force among the respective magnetic pole teeth 6f changes in accordance with the combination of the condition of winding of the coils, the intensity of the magnetic force of the rotor, and so on, it is difficult to correct the displacement of the stop position perfectly.

On the other hand, in the case where the stepping motor 1 is driven by so-called two-phase excitation, and when, for example, the rotor 5 stops sequentially at rotor stop positions shown by the symbols S1, S2, S3, S4 . . . with respect to the magnetic pole teeth 6f of the stator yokes 6a to 6d as shown in FIG. 12, theoretically, the positions D and A are excited at the stop position S1 so that the magnetic center coincides with the middle position between the positions D and A, that is, the stop position S1. Similarly, the positions A and C are excited when the rotor 5 stops at the stop position S2, the positions C and B are excited at the stop position S3, and the positions B and D are excited at the stop position S4, so that the magnetic centers in the respective cases theoretically coincide with the middle positions between the excited positions, that is, the stop positions S2, S3 and S4, respectively.

However, when the above-mentioned leakage of magnetic flux is generated, for example, at the stop position S2, the magnetic force of the housing 2 is given to the stator yoke 6a so that the magnetic force in the position A becomes intensive more than that in the position C. As a result, the magnetic center is slightly shifted toward the position A. Accordingly, the position where the rotor 5 stops actually is also shifted on the position A side.

Similarly, at the stop position S4, the magnetic force of the bracket 3 is given to the stator yoke 6d so that the magnetic force in the position D becomes intensive more than that in the position B. As a result, the magnetic center is shifted toward the position D. Accordingly, the position where the rotor 5 stops actually is also shifted to the position D side.

Further, in the stepping motor 1 configured thus, the stator yokes 6a to 6d are generally made of material having a thickness t of 1.0 or 0.8 mm as shown in FIG. 13(A).

In the case where the step angle, that is, the interval between the above-mentioned stop positions is made small, if the tooth width w of each of the magnetic pole teeth 6f of the stator yokes 6a to 6d is made narrow, that is, not larger than the thickness t, not only the stator yokes 6a to 6d are difficult to be finished, but also the accuracy of finishing becomes low.

It was therefore difficult to practically manufacture a stepping motor which was small both in size and in step angle, for example, a stepping motor in which the diameter was not larger than 50 mm and the step angle was not larger than 1.8 degrees.

In addition, when the thickness t of each of the stator yokes 6a to 6d was made thinner than the tooth width w of each of the magnetic pole teeth in order to improve the accuracy of finishing, the saturated magnetic capacities of the stator yokes 6a to 6d were lowered so that the magnetic force of the stator 4 as a whole was lowered. Therefore, there was a problem that the torque of the stepping motor 1 was lowered.

Further, in order to prevent the torque of the stepping motor 1 from being lowered, it is general that the length L of each of the magnetic pole teeth is made to be, for example, 1.5 times as large as an usual length, while the tooth width w is not changed, so that the area where each of the stator yokes 6a to 6d is opposite to the rotor 5 is increased.

However, when the length L of each of the magnetic pole teeth is increased, the magnetic inertia of magnetism emitted from the respective stator yokes 6a to 6d to the rotor 5 becomes high. As a result, when excitation is changed over at a high frequency, magnetic responsibility becomes low. Therefore, there was a problem that the high-speed rotation characteristic of the stepping motor 1 deteriorated. This is because the step angle is small so that the motor rotation speed becomes too low when the stepping motor 1 is driven at a low frequency.

SUMMARY OF INVENTION

Taking the foregoing problems into consideration, it is an object of the present invention to provide a stepping motor having a simple configuration, which is small both in size and in stepping angle, large in torque and capable of high-speed rotation.

In order to achieve the above object, according to the present invention, as stated in claim 1, there is provided a stepping motor comprising: a rotor constituted by a rotor magnet magnetized circumferentially and a rotating shaft attached to a center of the rotor magnet; a stator constituted by a plurality of phases of stator yokes arranged side by side in an axial direction of the stepping motor so as to surround the rotor, and coils wound in coil winding portions defined by the stator yokes; an armor member for holding the stator yokes with respect to the axial direction of the stepping motor; and each phase of the stator yokes being constituted by a pair of stator yokes on which magnetic pole teeth of plural phases arranged annularly are combined alternately; wherein the stator yokes are arranged so that every two phases of the stator yokes are paired to form an even number of sets of stator yokes; wherein two phases in each set of the stator yokes are reverse to each other; and wherein coils provided on the two phases of stator yokes in each set are connected to generate magnetic fields in series and in reverse to each other.

According to the above-mentioned configuration stated in the present invention, coils wound on two phases of stator yokes constituting each set are made reverse so that currents flow in the coils reversely to each other. Thus, the mutual magnetic interference can be reduced to a low level.

Therefore, any stator yoke of any phase in one set is subjected to magnetic interference from phases adjacent to the stator yoke in question, but magnetic interference is given to the stator yoke in question merely from another set adjacent to the one set in question. Accordingly, the magnetic interference from the adjacent phases can be reduced.

Since magnetic interference given to any stator yoke in any phase by stator yokes adjacent to the stator yoke in question is reduced in such a manner, the position accuracy of the step angle is improved.

In addition, even if the material forming the stator yokes is thin, the stator yoke material is high in electric resistance and low in core loss so that the high-frequency magnetic responsibility of the stator yoke material is improved. Accordingly, the high-frequency responsibility of the motor is also improved. In addition, the saturated magnetic capacity can be ensured because two phases of stator yokes are used as one set. It is therefore possible to prevent the driving torque from being lowered.

As a result, if the stator yoke material is made thin, the workability is not spoiled even if the tooth width of each of magnetic pole teeth is made smaller than that in the background art. It is therefore possible to form a stepping motor having a small step angle.

Further, since the stator is constituted by a plurality of sets of four-phase stator yokes, the total magnetic force of the rotor is also divided into four phases, so that the detent torque is reduced. It is therefore possible to reduce driving noise at the time of continuous driving. In this case, however, the number of stator yokes is required to be twice as large as that in the background art. However, since the stator yokes may be made thin, for example, to be half as thick as that in the background art, it is possible to restrain the material cost to be substantially equal to that in the background art.

In addition, since the structure of the stepping motor as a whole is substantially similar to that in the background art, the steps of assembling the stepping motor are similar to those in the background art. Therefore, the stepping motors of the present invention can be manufactured by using parts and manufacturing lines which have been used for stepping motors in the background art. It is therefore unnecessary to make an investment in additional equipment.

In the stepping motor stated in the present invention, the stator yokes are arranged so that in every adjacent two sets of the stator yokes, one of the adjacent two sets are shifted in phase by 90 degrees from the other one of the adjacent two sets.

In configuration described above, leakage of magnetic flux from one stator yoke to another stator yoke is generated only between the stator yokes 16d and 16e which are shifted in phase by 90 degrees from each other. The other stator yokes are all arranged to be reverse in phase to one another so that there is no fear that leakage of magnetic flux, that is, magnetic interference is generated among the stator yokes.

BRIEF DESCRIPTION OF DRAWINGS

FIG. 13 are views showing stator yokes in the stepping motor in FIG. 8: (A) is a partially enlarged sectional view; (B) is an enlarged view of magnetic pole teeth viewed from the inside; and (C) is an enlarged view of magnetic pole teeth the whole length of each of which is made large.

DETAILED DESCRIPTION OF PREFERRED EMBODIMENTS

Figure 1:
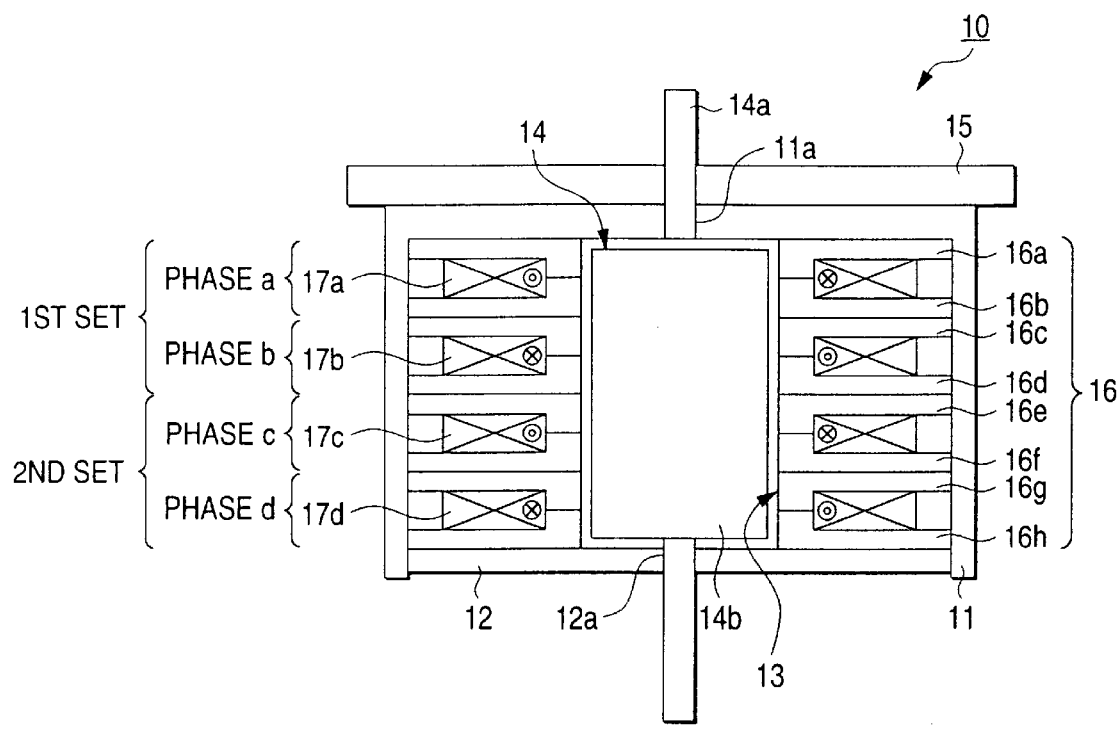
FIG. 1 is a schematic sectional view showing a configuration of an embodiment of a stepping motor according to the present invention.

The present invention will be described in detail below on the basis of embodiments shown in the drawings.

FIG. 1 shows a configuration of an embodiment of a stepping motor according to the present invention.

In FIG. 1, a stepping motor 10 is constituted by a hollow cylindrical housing 11 having an open end, a bracket 12 for closing the open end of the housing 11, a stator 13 provided along the inner circumferential surface of this housing 11, a rotor 14 rotatably supported by bearing portions 11a and 12a provided in the housing 11 and the bracket 12 respectively, and a flange 15 attached to the closed end of the housing 11.

The above-mentioned housing 11 is made of metal material and provided with the bearing portion 11a at a position near the center of the closed end surface of the housing 11.

The above-mentioned bracket 12 is made of metal material and provided with the bearing portion 12a at a position near the center of the bracket 12 in the same manner as in the housing 11.

The above-mentioned stator 13 is constituted by a substantially cylindrical yoke unit 16 and coils 17a to 17d. In the yoke unit 16, eight stator yokes 16a to 16h each provided with a ring-like flange portion having an outer diameter substantially equal to the inner diameter of the housing 11 are integrally molded with resin (not shown) in the same manner as in the background art, so that the yoke unit 16 can be stored in the housing 11. The coils 17a to 17d are wound on coil winding portions defined by the stator yokes 16a and 16b, 16c and 16d, 16e and 16f and 16g and 16h, respectively. The stator 13 is received and fixedly held in the housing 11 after the coils 17a to 17d are wound.

The above-mentioned rotor 14 is constituted by a rotating shaft 14a rotatably supported by the above-mentioned bearing portions 11a and 12a, and a hollow cylindrical rotor magnet 14b fixedly held on the rotating shaft 14a. This rotor magnet 14b is formed to have an outer diameter slightly smaller than the inner diameter of a central hole of the yoke unit 16. The rotor magnet 14b is magnetized circumferentially.

Figure 10:
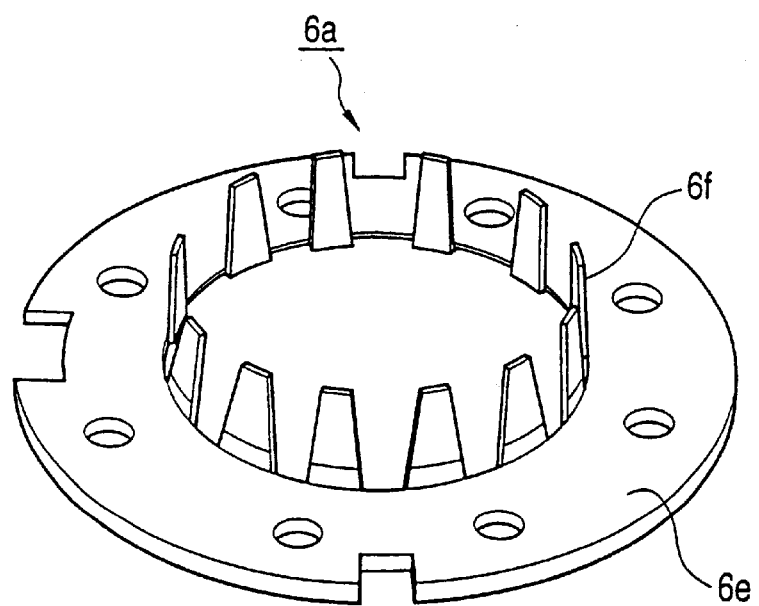
FIG. 10 is an enlarged perspective view of a stator yoke in the stepping motor in FIG. 8.
Figure 11:
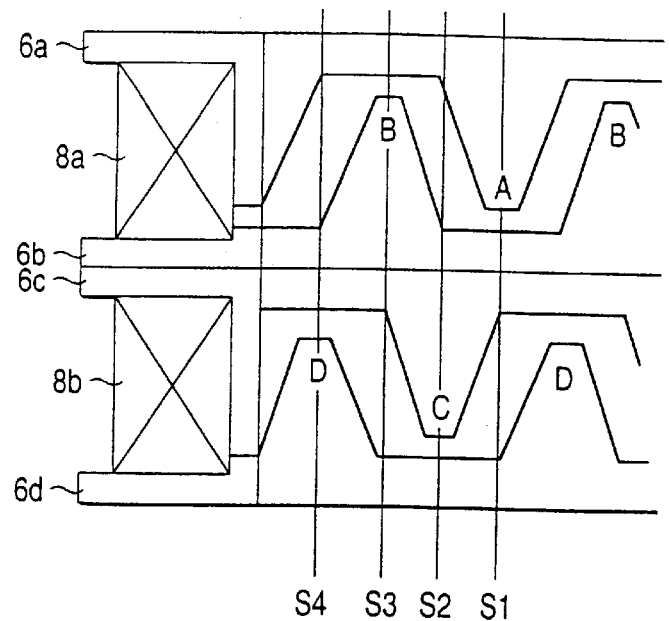
FIG. 11 is a view showing leakage of magnetic flux in the case of the stepping motor driven with single-phase excitation in FIG. 8.
Figure 12:
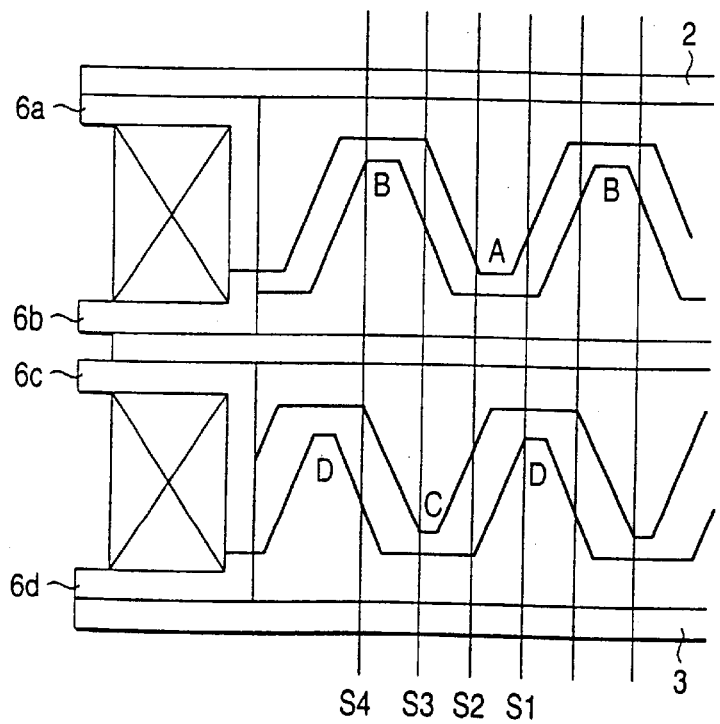
FIG. 12 is a view showing leakage of magnetic flux in the case of the stepping motor driven with two-phase excitation in FIG. 8.

Here, each of the above-mentioned stator yokes 16a to 16h is made of conductive metal material, for example, in the same manner as in the stator yoke 6a shown in FIG. 10, but formed to be thinner than the background-art stator yoke 6a. Each of the stator yokes 16a to 16h is constituted by a ring-like flange portion and a large number of magnetic pole teeth provided to erect vertically from an inner circumferential portion of this ring-like flange portion.

Each of the above-mentioned stator yokes 16a to 16h may be made of material which is as thick as that of a stepping motor in the background art.

Figure 2:
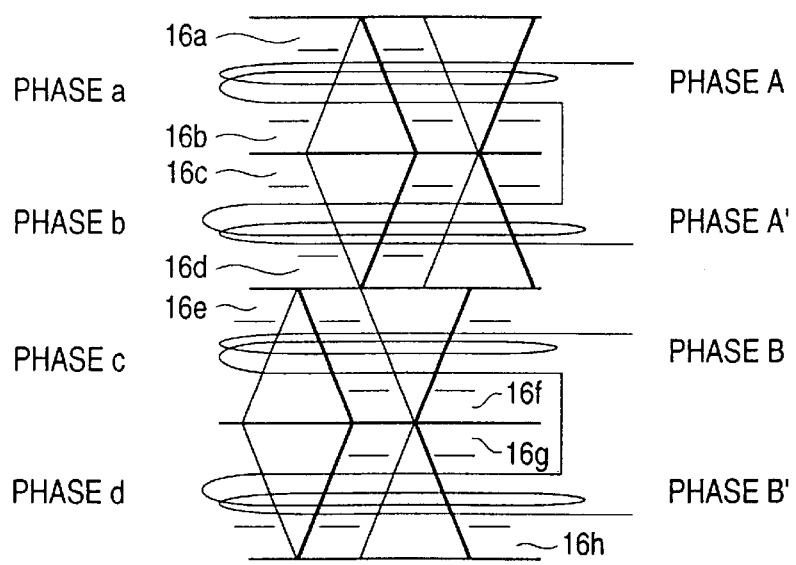
FIG. 2 is a partially enlarged front view showing the state in which magnetic pole teeth are arranged in stator yokes in the stepping motor in FIG. 1.

The stator yokes are combined so that the stator yokes 16b and 16c, 16d and 16e, and 16f and 16g are put back to back with each other. The pairs of the stator yokes 16a and 16b, 16c and 16d, 16e and 16f, and 16g and 16h constitute phases a, b, c and d respectively, as shown in FIGS. 1 and 2.

Further, the stator yokes are arranged so that the stator yokes 16a to 16d of adjacent two phases a and b constitute a first set and the stator yokes 16e to 16h of adjacent two phases c and d constitute a second set, and so that the magnetic pole teeth of the stator yokes 16a to 16d of the first set are shifted in phase by 90 degrees from the magnetic pole teeth of the stator yokes 16e to 16h of the second set, respectively.

Since the respective magnetic pole teeth are arranged thus, leakage of magnetic flux from one stator yoke to another stator yoke is generated only between the stator yokes 16d and 16e which are shifted in phase by 90 degrees from each other. The other stator yokes are all arranged to be reverse in phase to one another so that there is no fear that leakage of magnetic flux, that is, magnetic interference is generated among the stator yokes.

The eight stator yokes 16a to 16h are integrally molded with resin in a condition that they are combined as mentioned above. The yoke unit 16 is completed thus.

As for the coils 17a to 17d wound on the coil winding portions of the stator yokes of the phases a to d respectively, the coils 17a and 17b are connected in series and in reverse to each other, and similarly the coils 17c and 17d are connected in series and in reverse to each other, as shown in FIG. 2.

Figure 3:
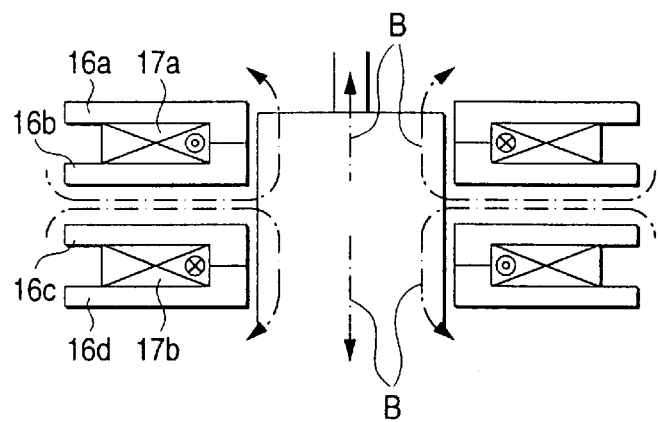
FIG. 3 is a partially sectional view showing the relationship between an electric current and a magnetic field with respect to one set of stator yokes in the stepping motor in FIG. 1.

As a result, in each set of stator yokes and coils, for example, in the first set of the stator yokes 16a to 16d and the coils 17a and 17b as shown in FIG. 3, currents I flow through the coils 17a and 17b in the phases a and b reversely to each other, so that the directions of magnetic fields generated in the phases a and b respectively are reverse to each other as shown by the arrows B in FIG. 3. Therefore, since magnetic flux passing between the stators 16b and 16c is generated in the same direction, the magnetic fields do not cancel each other, so that no magnetic interference is not generated.

Figure 4:
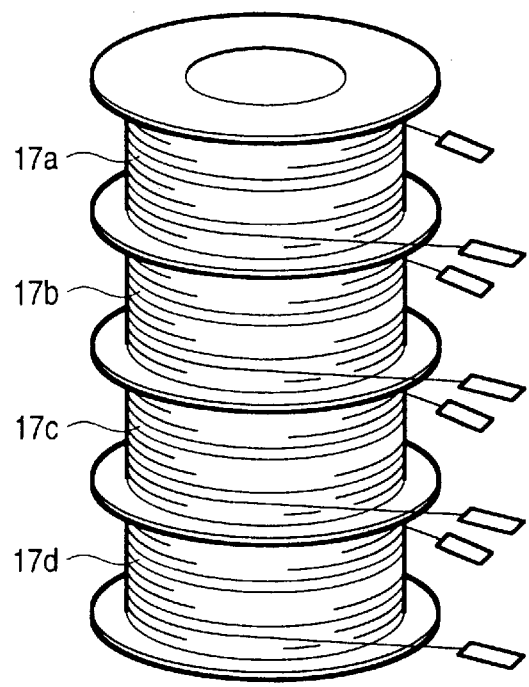
FIG. 4(a) and (b) are schematic perspective view and a wiring diagram showing the state in which respective coils of a stator are connected with one another in the stepping motor in FIG. 1.
Figure 4:
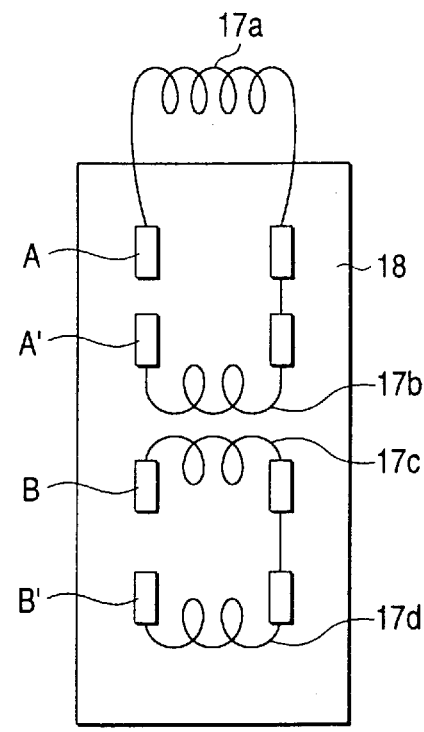

Here, winding terminals of the respective coils 17a and 17d are led to a board 18 (see FIGS. 4(a) and (b)) provided in the outside of the motor, so that the wire connections of the respective coils 17a to 17d can be made on this board 18 as shown in FIG. 4(a) and (b). The coils 17a and 17b and the coils 17c and 17d are driven as phases A and A' and phases B and B' respectively by a driving circuit which is similar to that in a stepping motor having a two-phase structure in the background art.

In the stepping motor 10 configured thus according to the embodiment of the present invention, driving currents are applied from a not-shown driving circuit to the coils 17a to 17d wound on the coil winding portions, respectively, of the yoke unit 16 of the stator 13 so that magnetic fields generated in the coils 17a to 17d respectively interact with the magnetic field of the rotor magnet 14b through the respective stator yokes 16a to 16h of the yoke unit 16. Then, the rotor 14 is driven to rotate intermittently by the effect of the magnetic pole teeth of the respective stator yokes 16a to 16h.

While each stator yoke constitutes a phase in the background-art stepping motor, two phases of stator yokes constitute a set in the stepping motor 10 according to the embodiment of the present invention. It is therefore possible to reduce magnetic interference between stator yokes in adjacent phases. Accordingly, the position accuracy of the step angle (static angle accuracy) is improved.

Figure 5:
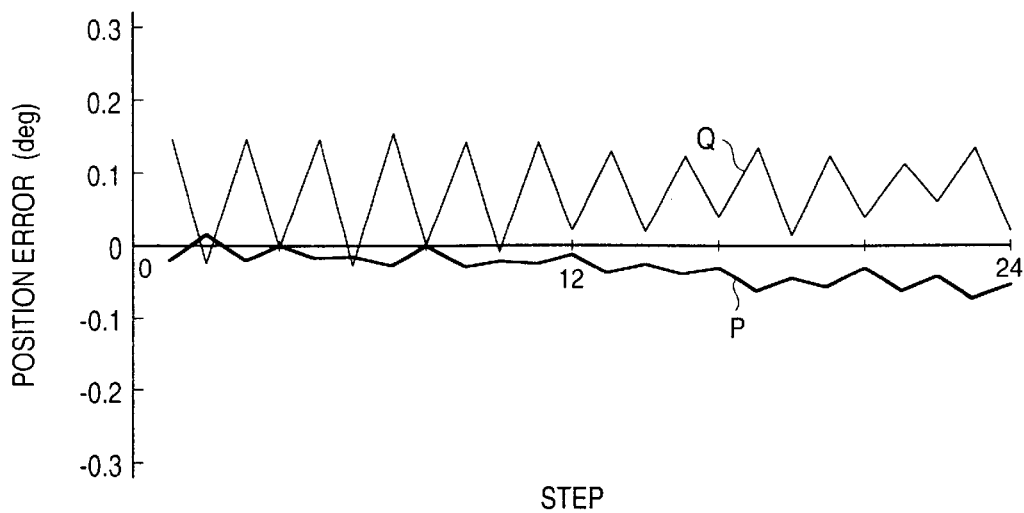
FIG. 5 is a graph showing the step angle accuracy of the stepping motor according to the present invention shown in FIG. 1 and that of a background-art stepping motor in FIG. 8, in the case of two-phase excitation.

For example, in the static angle accuracy in the case where the stepping motor 10 is driven with two-phase excitation, a characteristic curve shown by the symbol P in FIG. 5 is exhibited. On the other hand, in the static angle accuracy in the background-art stepping motor driven with two-phase excitation, a characteristic curve shown by the symbol Q in FIG. 5 is exhibited. It is therefore understood that the stepping motor 10 according to the embodiment of the present invention is higher in the static angle accuracy.

Figure 6:
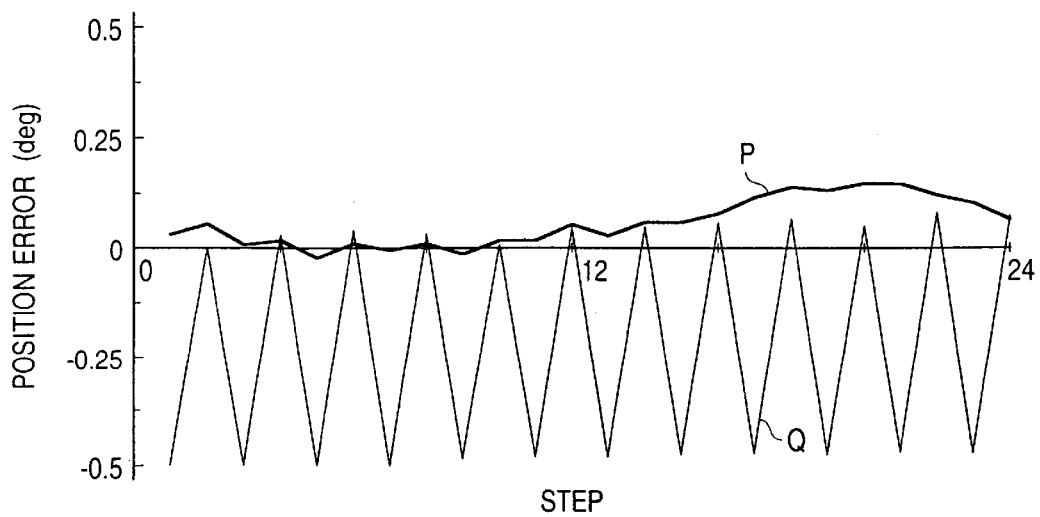
FIG. 6 is a graph showing the step angle accuracy of the stepping motor according to the present invention shown in FIG. 1 and that of the background-art stepping motor in FIG. 8, in the case of single-phase excitation.

In addition, in the static angle accuracy in the case where the stepping motor 10 has a single-phase structure, a characteristic curve shown by the symbol P in FIG. 6 is exhibited. On the other hand, in the static angle accuracy in the background-art two-phase-driven stepping motor, a characteristic curve shown by the symbol Q in FIG. 6 is exhibited. It is therefore understood that the stepping motor 10 according to the embodiment of the present invention is higher in the static angle accuracy also in the case of the single-phase-driven stepping motor.

In addition, even if the material forming the stator yokes is thin, two phases of stator yokes are used as one set, so that the saturated magnetic capacity can be ensured. Accordingly, there is no fear that the driving torque is lowered.

Further, when material for the stator yoke is made thin, the electric resistance becomes high and the core loss becomes low, so that the high-frequency magnetic responsibility of material for the stator yoke is improved. Accordingly, the high-frequency responsibility of the stepping motor 10 is also improved.

Figure 7:
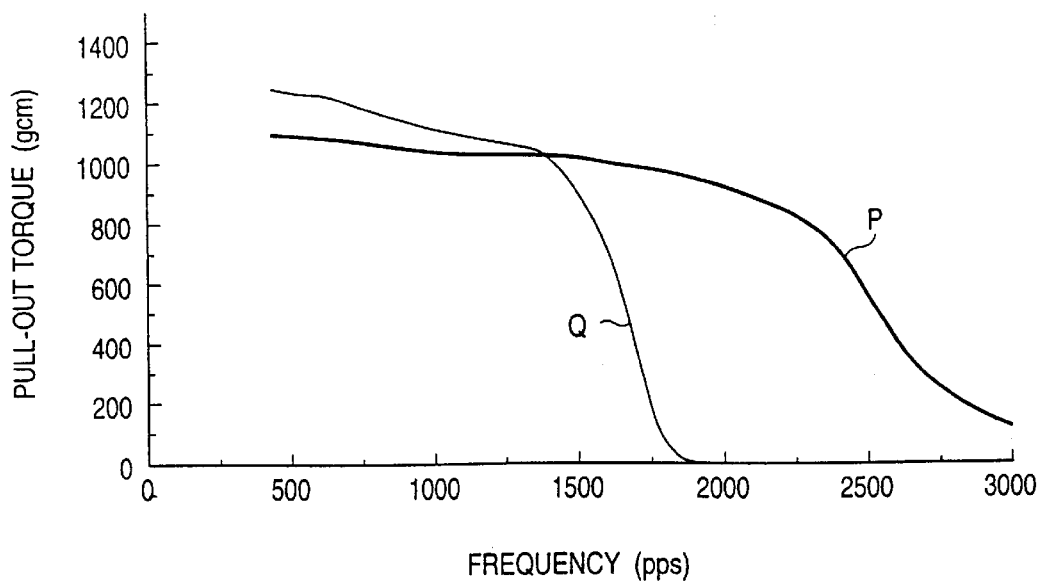
FIG. 7 is a graph showing the torque characteristic of the stepping motor according to the present invention shown in FIG. 1 and that of the background-art stepping motor in FIG. 8.
Figure 8:
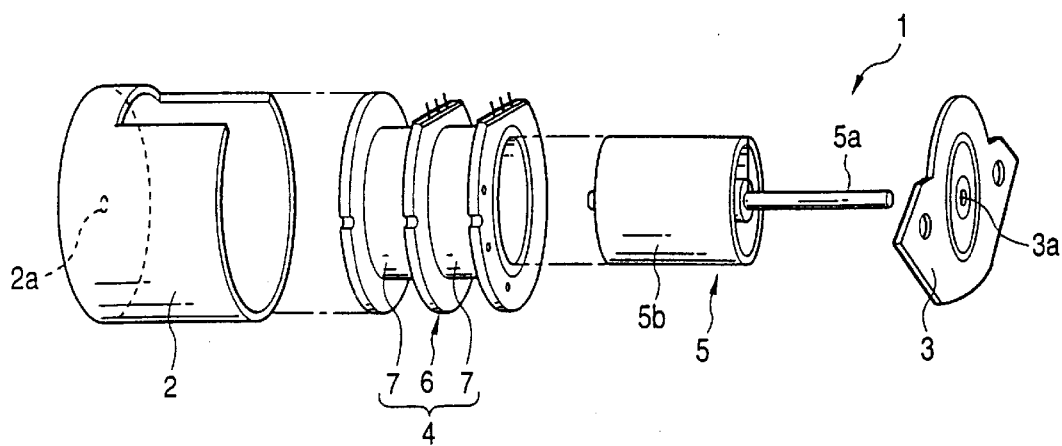
FIG. 8 is an exploded perspective view showing a configuration of an example of a stepping motor in the background art.
Figure 9:
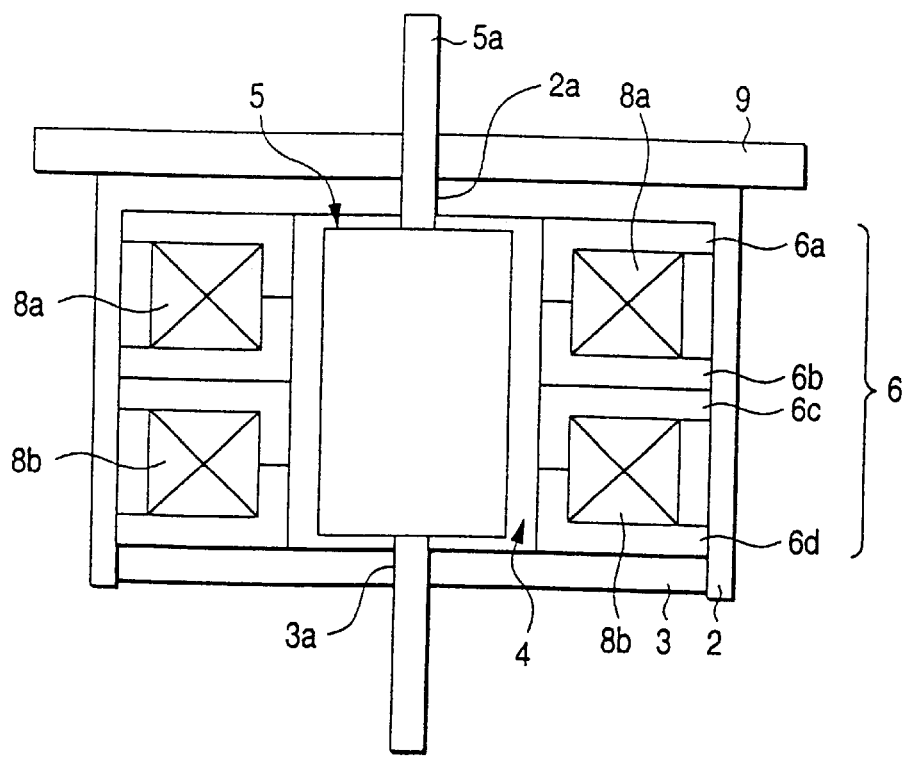
FIG. 9 is a schematic sectional view of the stepping motor in FIG. 8.

For example, the torque to frequency in the stepping motor 10 takes a sufficiently high value up to a comparatively high frequency as shown by the symbol P in FIG. 7. However, the torque to frequency in the background-art stepping motor drops at a comparatively low frequency as shown by the symbol Q in FIG. 7. It is therefore understood that the stepping motor 10 according to the embodiment of the present invention is larger in the driving torque at a high frequency.

Thus, even if the width of each of the magnetic pole teeth of the stator yokes 16a to 16d is made smaller than that in the background art, the workability is not spoiled by making the material for the stator yokes 16a to 16d thin. It is therefore possible to form a stepping motor having a small step angle.

Further, in the illustrated case, the yoke unit 16 is constituted by the stator yokes 16a to 16h of four phases which are grouped into two sets, so that the total magnetic force of the rotor 14 is also divided into four phases. Accordingly, the detent torque is reduced so that driving noise at the time of continuous driving can be reduced.

Here, the yoke unit 16 requires stator yokes twice as many as in the background-art yoke unit. However, the thickness of each stator yoke may be made thinner. For example, if the thickness is reduced to half, the material cost can be kept substantially equal to that in the background art.

In addition, since the structure of the stepping motor as a whole is substantially similar to that in the background art, the same assembling process as in the background art may be used. Therefore, the stepping motor 10 can be manufactured by using parts and a manufacturing line for the background-art stepping motor as they are. Therefore, an investment in an additional equipment is unnecessary.

Although the yoke unit 16 has the stator yokes 16a to 16h of four phases which are grouped into two sets in the above-mentioned embodiment, it is apparent that the present invention is not limited to this, but applicable to a stepping motor having an even number of phases, more than three sets of stator yokes.

As has been described above, according to the present invention, coils wound on two phases of stator yokes constituting each set are made reverse so that currents flow in the coils reversely to each other. Thus, the mutual magnetic interference can be reduced to a low level.

Therefore, any stator yoke of any phase in one set is subjected to magnetic interference from phases adjacent to the stator yoke in question, but magnetic interference is given to the stator yoke in question merely from another set adjacent to the one set in question. Accordingly, the magnetic interference from the adjacent phases can be reduced.

Since magnetic interference given to any stator yoke in any phase by stator yokes adjacent to the stator yoke in question is reduced in such a manner, the position accuracy of the step angle is improved.

In addition, even if the material forming the stator yokes is thin, the stator yoke material is high in electric resistance and low in core loss so that the high-frequency magnetic responsibility of the stator yoke material is improved. Accordingly, the high-frequency responsibility of the motor is also improved. In addition, the saturated magnetic capacity can be ensured because two phases of stator yokes are used as one set. It is therefore possible to prevent the driving torque from being lowered.

As a result, if the stator yoke material is made thin, the workability is not spoiled even if the tooth width of each of magnetic pole teeth is made smaller than that in the background art. It is therefore possible to form a stepping motor having a small step angle.

Further, since the stator is constituted by a plurality of sets of four-phase stator yokes, the total magnetic force of the rotor is also divided into four phases, so that the detent torque is reduced. It is therefore possible to reduce driving noise at the time of continuous driving. In this case, however, the number of stator yokes is required to be twice as large as that in the background art. However, since the stator yokes may be made thin, for example, to be half as thick as that in the background art, it is possible to restrain the material cost to be substantially equal to that in the background art.

In addition, since the structure of the stepping motor as a whole is substantially similar to that in the background art, the steps of assembling the stepping motor are similar to those in the background art. Therefore, the stepping motors of the present invention can be manufactured by using parts and manufacturing lines which have been used for stepping motors in the background art. It is therefore unnecessary to make an investment in additional equipment.

Thus, according to the present invention, there is obtained an extremely superior stepping motor having a simple configuration, which is small both in size and in stepping angle, large in torque and capable of high-speed rotation.

Further, leakage of magnetic flux from one stator yoke to another stator yoke is generated only between the stator yokes 16d and 16e which are shifted in phase by 90 degrees from each other. The other stator yokes are all arranged to be reverse in phase to one another so that there is no fear that leakage of magnetic flux, that is, magnetic interference is generated among the stator yokes.

What is claimed is:

1. A stepping motor comprising:

a rotor including a rotor magnet magnetized circumferentially and a rotating shaft attached to a center of said rotor magnet;

a stator including a plurality of stator yokes arranged side by side in an axial direction of said stepping motor so as to surround said rotor;

a plurality of coils wound around respective pairs of said stator yokes; and an armor member for holding said stator yokes with respect to the axial direction of said stepping motor, wherein each of said stator yokes includes magnetic pole teeth arranged annularly, wherein the teeth in each of said pairs of stator yokes are combined alternately;

wherein said stator yokes are arranged to form an even number of sets of stator yokes, with each set including two of said pairs of stator yokes;

wherein in each set said coils have reverse windings relative to one another and are connected in series to generate magnetic fields in reverse of each other, and wherein phase windings in adjacent sets of stator yokes are different from one another.

2. A stepping motor according to claim 1, wherein said stator yokes are arranged so that, in every adjacent two sets of said stator yokes, one of said adjacent two sets is shifted in phase by approximately 90 degrees from the other one of said adjacent two sets.

3. A stepping motor, comprising:

a rotor;

a stator axially aligned with said rotor and including an even number of sets of stator yokes, each of said sets includes two pairs of stator yokes on which magnetic pole teeth are annularly arranged;

a plurality of coils wound around respective pairs of said stator yokes; and a circuit for inputting current into said plurality of coils, said circuit inputting current into adjacent ones of said coils in each set in reverse directions, wherein each of said sets includes two phase windings of said coils which are different from one another, and wherein the phase windings in adjacent sets of said stator yokes are all different from one another.

4. A stepping motor according to claim 3, wherein said stator yokes are arranged so that in adjacent sets of said stator yokes, one of said adjacent two sets is shifted in phase by approximately 90 degrees from the other one of said adjacent two sets.

* * * * *

UNITED STATES PATENT AND TRADEMARK OFFICE
CERTIFICATE OF CORRECTION

PATENT NO. : 6,323,569 B1  Page 1 of 1
DATED : November 27, 2001
INVENTOR(S) : Akama It is certified that error appears in the above-identified patent and that said Letters Patent is hereby corrected as shown below:

<u>Title page,</u>
Item [73], change the Assignee to: -- Mitsumi Electric Co., Ltd, Tokyo, Japan --

Signed and Sealed this

Twenty-fourth Day of December, 2002

JAMES E. ROGAN
*Director of the United States Patent and Trademark Office*